US009115838B2

(12) United States Patent
Konishi (10) Patent No.: US 9,115,838 B2
(45) Date of Patent: Aug. 25, 2015

(54) RAPID-CONNECT COUPLER

(75) Inventor: Howard M. Konishi, Kirkland, WA (US)

(73) Assignee: Engineered Controls International, LLC, Elon, NC (US)

( * ) Notice: Subject to any disclaimer, the term of this patent is extended or adjusted under 35 U.S.C. 154(b) by 183 days.

(21) Appl. No.: 13/206,828

(22) Filed: Aug. 10, 2011

(65) Prior Publication Data
US 2012/0037247 A1 Feb. 16, 2012

Related U.S. Application Data

(60) Provisional application No. 61/414,356, filed on Nov. 16, 2010, provisional application No. 61/372,204, filed on Aug. 10, 2010.

(51) Int. Cl.
| F16L 37/40 | (2006.01) |
| F16L 37/23 | (2006.01) |
| F16L 37/12 | (2006.01) |

(52) U.S. Cl.
CPC .............. *F16L 37/40* (2013.01); *F16L 37/1215* (2013.01); *F16L 37/23* (2013.01)

(58) Field of Classification Search
CPC ........ F16L 37/40; F16L 37/23; F16L 37/1215
USPC .............. 251/149.1; 285/35, 86, 88, 316–317
See application file for complete search history.

(56) References Cited

U.S. PATENT DOCUMENTS

| 2,259,137 | A | * | 10/1941 | Iftiger, Sr. ........................ 285/35 |
| 2,327,714 | A | * | 8/1943 | Iftiger, Sr. ........................ 285/35 |
| 2,797,110 | A | * | 6/1957 | Covington ....................... 285/86 |
| 3,674,051 | A | * | 7/1972 | Stratman .................. 137/614.04 |
| 3,757,836 | A | * | 9/1973 | Masuda ......................... 141/312 |
| 4,398,561 | A | * | 8/1983 | Maldavs .................. 137/614.05 |
| 4,543,995 | A |   | 10/1985 | Weh et al. |
| 4,716,938 | A |   | 1/1988 | Weh et al. |
| 4,884,830 | A |   | 12/1989 | Meisinger |
| 5,080,132 | A | * | 1/1992 | Manz et al. ............... 137/614.04 |
| 5,211,197 | A | * | 5/1993 | Marrison et al. ......... 137/614.04 |
| 5,255,714 | A | * | 10/1993 | Mullins ..................... 137/614.04 |
| 5,293,902 | A |   | 3/1994 | Lapierie |
| 5,577,706 | A | * | 11/1996 | King .......................... 251/149.6 |
| 5,580,099 | A | * | 12/1996 | Eaton .............................. 285/35 |
| 5,649,723 | A | * | 7/1997 | Larsson .......................... 285/34 |
| 5,706,967 | A |   | 1/1998 | Weh et al. |

(Continued)

FOREIGN PATENT DOCUMENTS

CN 1608910 A 4/2005

OTHER PUBLICATIONS

Korean Intellectual Property Office, PCT/US2011/047282 International Search Report, Feb. 28, 2012.

(Continued)

*Primary Examiner* — John K Fristoe, Jr.
*Assistant Examiner* — David Colon Morales
(74) *Attorney, Agent, or Firm* — Neal, Gerber & Eisenberg LLP (57) ABSTRACT

A rapid-connect gas coupler is shown and described herein. In an embodiment, the rapid-connect gas coupler includes a spring-loaded probe within a probe cavity, which is defined by a housing and one or more latch segment. The probe can engage with a gas connector, which causes the latch segment to engage and couple with the gas connector.

31 Claims, 10 Drawing Sheets

(56) References Cited

U.S. PATENT DOCUMENTS

| | | |
|---|---|---|
| 5,788,443 A | 8/1998 | Cabahug |
| 5,950,679 A | 9/1999 | Danielson et al. |
| 6,039,303 A * | 3/2000 | Danielson et al. ......... 251/149.6 |
| 6,073,974 A | 6/2000 | Meisinger et al. |
| 6,257,278 B1 * | 7/2001 | Danielson et al. ....... 137/614.03 |
| 6,343,630 B1 * | 2/2002 | Dubinsky ..................... 141/385 |
| 6,398,268 B1 * | 6/2002 | Takahashi et al. ............ 285/316 |
| 7,497,231 B2 * | 3/2009 | Sasa ........................ 137/614.06 |
| 7,568,737 B2 * | 8/2009 | Wells et al. ................... 285/391 |
| 2007/0001143 A1 | 1/2007 | Konishi |
| 2008/0185837 A1 | 8/2008 | Danielson |
| 2009/0140519 A1 | 6/2009 | Pavnaskar et al. |
| 2009/0165870 A1 | 7/2009 | Konishi |
| 2010/0148499 A1 * | 6/2010 | Le Quere ..................... 285/310 |

OTHER PUBLICATIONS

Office Action issued on Mar. 19, 2014 for Chinese Patent Application No. 2011800489135.

Office Action issued on Nov. 26, 2014 for Chinese Patent Application No. 2011800489135.

* cited by examiner

RAPID-CONNECT COUPLER

PRIORITY CLAM

This application claims the benefit of U.S. Provisional Application No. 61/372,204 filed on Aug. 10, 2010 and 61/414,356 filed on Nov. 16, 2010, which applications are incorporated herein by reference in their entireties for all purposes.

TECHNICAL FIELD

This disclosure relates generally to gas couplings, and more specifically to rapid-connect gas couplers.

BACKGROUND

An ordinary cylinder used to hold a gas under pressure may include a threaded socket inlet which leads to a check valve that is held in closed position by the pressure of the gas inside the cylinder.

Whenever a gas cylinder is to be charged with gas under pressure, it is necessary to tightly screw a fitting into or on a threaded socket inlet of the gas cylinder in order to connect the gas cylinder inlet to a supply of gas under pressure. The operation of screwing a fitting into the threaded socket inlet of a gas cylinder is time-consuming and therefore un-desirable when filling a large number of gas cylinders in a manufacturing plant or at a refilling station. For example, two steps of operation are required to make a connection with most couplers, which substantially increases the time and cost of cylinder refilling. Moreover, the repetitive motion of twisting the wrist can lead to carpal-tunnel syndrome or the like, which can be detrimental to the operators of a refilling station.

Although rapid-connect couplers exist for filling a gas cylinder, these couplers are deficient because they fail to consistently provide an airtight seal with the cylinder. Accordingly, filling gas cylinders can be inefficient because of the time it takes to properly seat the coupler, and the fact that improper seating often goes unnoticed, which also results in wasted time.

Additionally, existing rapid-connect couplers are also deficient because they are typically unable to adapt to more than one type of socket inlet. For example, some socket inlets may have a check valve which must be actuated for gas to flow through the valve, and such a check valve may be located in various locations and be associated with various diameters of inlet channels. Other socket inlets may not have a check valve. Existing rapid-connect couplers are not able couple with many types of inlets and are not re-configurable. A new coupler is typically required for each type of inlet.

BRIEF DESCRIPTION OF THE DRAWINGS

The present subject matter disclosure will be described by way of exemplary embodiments but not limitations, illustrated in the accompanying drawings in which like references denote similar elements, and in which.

DETAILED DESCRIPTION

Illustrative embodiments presented herein include, but are not limited to, systems and methods for providing a rapid-connect gas coupler.

Various aspects of the illustrative embodiments will be described using terms commonly employed by those skilled in the art to convey the substance of their work to others skilled in the art. However, it will be apparent to those skilled in the art that the embodiments described herein may be practiced with only some of the described aspects. For purposes of explanation, specific numbers, materials and configurations are set forth in order to provide a thorough understanding of the illustrative embodiments. However, it will be apparent to one skilled in the art that the embodiments described herein may be practiced without the specific details. In other instances, well-known features are omitted or simplified in order not to obscure the illustrative embodiments.

Figure 1:
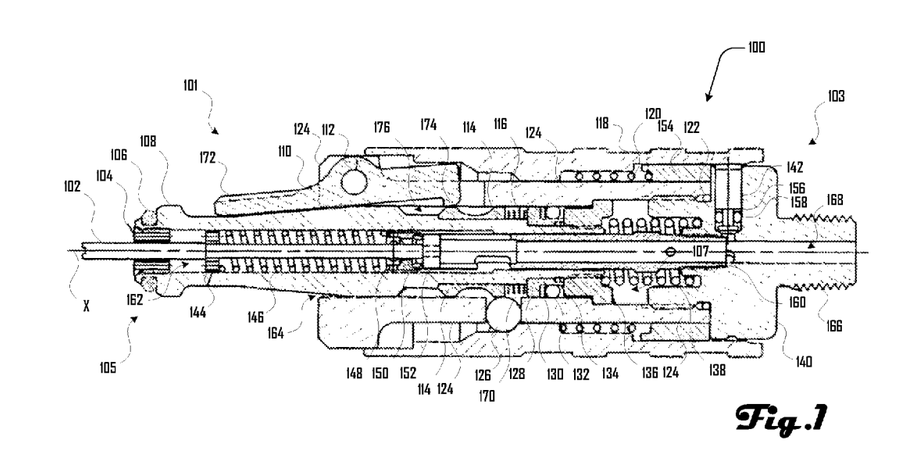
FIG. 1 is a cross section of a rapid-connect coupler in a first configuration in accordance with an embodiment.
Figure 4:
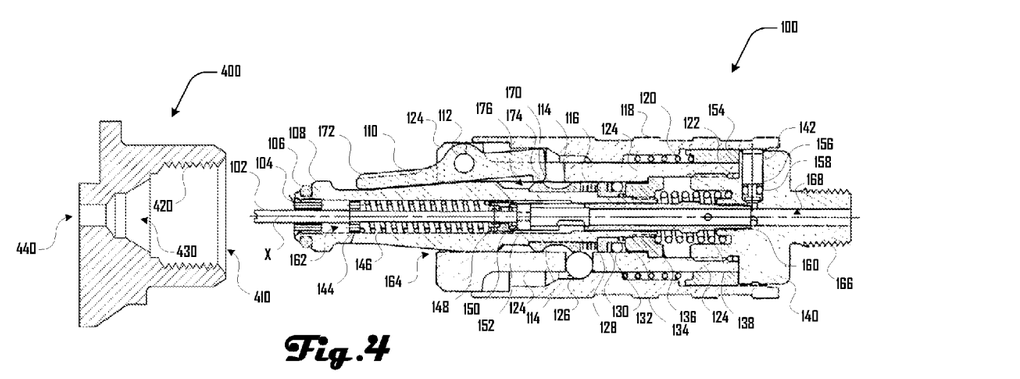
FIG. 4 is a cross section of a rapid-connect coupler and a cross section of a gas connector in accordance with the embodiment of FIG. 1.
Figure 5:
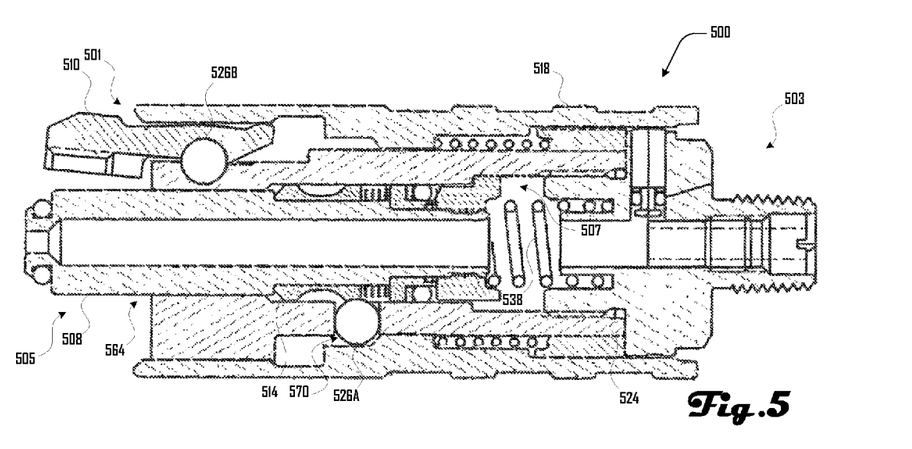
FIG. 5 is a cross section of a rapid-connect coupler in a first configuration in accordance with another embodiment.

A rapid-connect gas coupler 100, 500 is shown and described herein (e.g., FIGS. 1 and 5). In an embodiment, the rapid-connect gas coupler 100, 500 includes a spring-loaded probe 108, 508 within a probe cavity 164, 564 which is defined by a housing 124, 524 and one or more latch segment 110, 510. The probe 108, 508 can engage with a gas connector 400, 800 (FIGS. 4 and 8), which causes the latch segment 110, 510 to engage and couple with the gas connector 400, 800 as discussed herein.

For example, in one or more embodiment, the rapid-connect gas coupler 100, 500 may include an elongated housing 124, 524 having a first-housing end 101, 501 and a second-housing end 103, 503, and defining a probe cavity 164, 564. The rapid-connect gas coupler 100, 500 may also include an elongated probe 108, 508 having a first-probe end 105, 505 and a second-probe end 107, 507 and slidably residing within the probe cavity 164, 564 at the first-housing end 101, 501 with the first-probe end 105, 505 extending from the probe cavity 164, 564. The rapid-connect gas coupler 100, 500 may also include an elongated fluid passageway 162, 562 defined by the probe 108, 508 and housing 124, 524 and communicating between the first-probe end 105, 505 and the second-housing end 103, 503. The rapid-connect gas coupler 100, 500 may include one or more latch segments 110, 510 pivotally coupled to the first-housing end 101, 501 and an elongated sleeve 118, 518 slidably residing about the housing 124, 524, probe 108, 508 and one or more latch segments 110, 510.

Some embodiments may comprise an elongated check-valve-actuating apparatus 102, 910, disposed within a portion of the fluid passageway and extending from the first-probe end 105, 505.

Some embodiments may include an elongated housing 124, 524 having a substantially cylindrical first-housing end 101, 501 and a second-housing end 103, 503 and defining a probe cavity 164, 564. Some embodiments may also include an elongated and substantially cylindrical probe 108, 508 having a first-probe end 105, 505 and a second-probe end 107, 507 and slidably residing within the probe cavity 164, 564 at the first-housing end 101, 501 with the first-probe end 105, 505 extending from the probe cavity 164, 564. Some embodiments may include one or more latch segments 110, 510 pivotally coupled about the first-housing end 101, 501 circumference and fixed in position and inoperable to translate about the first-housing end 101, 501 circumference.

Some embodiments may include a biased ball cam 114, 514 surrounding a portion of the probe 108, 508 within the probe cavity 164, 564. The ball cam 114, 514 may be slidably biased along the length of the probe 108, 508 toward the probe first end 105, 505. Some embodiments may include a ball cavity 170, 570 defined by a portion of the sleeve 118, 518 and a portion of the housing 124, 524 with a ball 126, 526 disposed in the ball cavity 170, 570. The probe 108, 508 may be configured to slide longitudinally within the probe cavity 164, 564 from a resting position to a coupling position where the ball cam 114, 514 is misaligned with the ball cavity 170, 570 and ball 126, 526 in the resting position and where the ball cam 114, 514 is aligned with the ball cavity 170, 570 and ball 126, 526 in the resting coupling position.

Figure 2:
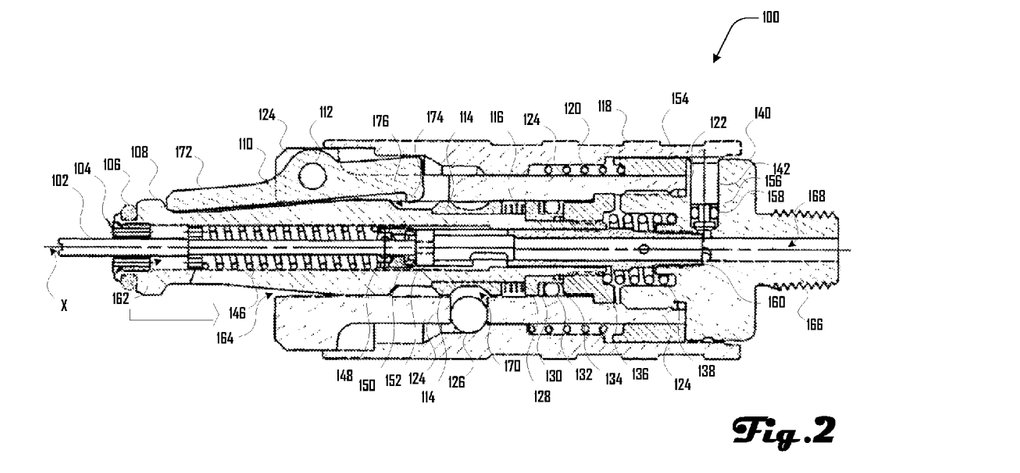
FIG. 2 is a cross section of the rapid-connect coupler in a second configuration in accordance with the embodiment of FIG. 1.
Figure 3:
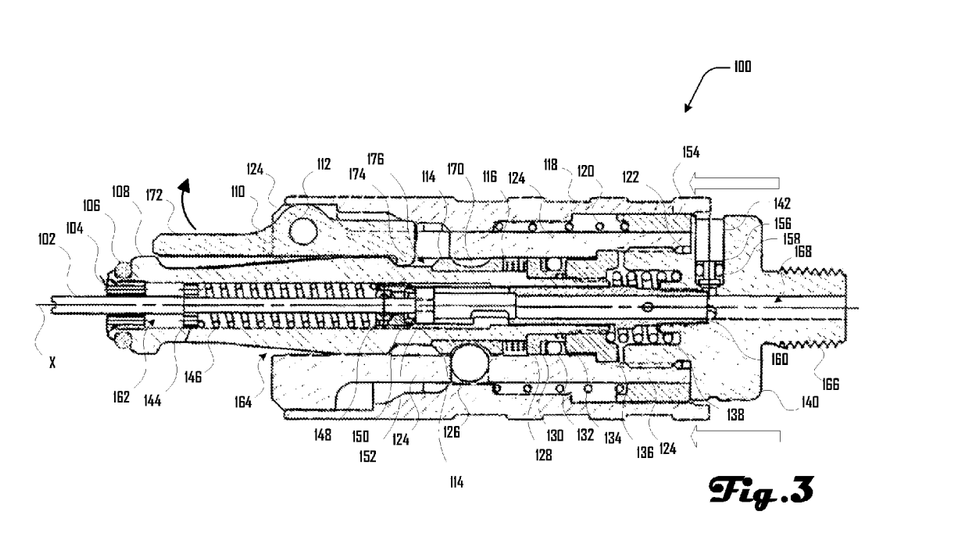
FIG. 3 is a cross section of the rapid-connect coupler in a third configuration in accordance with the embodiment of FIG. 1.

FIGS. 1-4 depict a rapid-connect coupler 100 in accordance with an embodiment, which may be operable to couple with a gas connector 400 (FIG. 4). FIG. 1 depicts the rapid-connect coupler 100 in a first configuration, which may be a resting configuration before the rapid-connect coupler 100 couples with a gas connector 400. FIGS. 2 and 3 depict the rapid-connect coupler 100 in second and third configurations, which may represent configuration that the rapid-connect coupler 100 assumes when coupling with or when coupled to a gas connector 400.

As shown in FIGS. 1-4, the rapid-connect coupler 100 comprises a probe 108, which is an elongated member that extends from the front end of the rapid-connect coupler 100 and resides within a probe cavity 164. Probe packing 106 is present at the front end of the probe 108. The probe 108 defines a cylindrical tip cavity 162, which extends through the probe 108 along a central axis X.

A tip 102 resides within the tip cavity 162 extending down the central axis X, and is supported by a front guide 104, and a pad spring 148. The tip 102 is further associated with a washer 144, a tip spring 146, and a pad spring 148, which makes the tip 102 spring-loaded within the tip cavity 162 along the central axis X.

The probe 108 comprises a first and second probe end 105, 107 and resides within the probe cavity 164, which is defined by a housing 124, and a latch segment 110, which is coupled to the housing 124, via at least one latch pin 112. The latch segment 110 comprises a latch nose 172, and a latch lip 174.

In various embodiments, there may be a plurality of latch segments 110. For example, there may be a first, second, and third latch segment 110 positioned within the housing 124. In some embodiments, there may be any suitable number of latch segments 110. Latch segments 110 may be positioned around the circumference of the probe 108 and may facilitate coupling of the rapid-connect coupler 100 with a gas connector 400 (FIG. 4).

The probe 108 further comprises a cam spring 116, a seat 128, a backup ring 130, rear-probe packing 132, lock-ring packing 134, and a lock ring 136.

Additionally, the rear end of the probe 108 slidably surrounds a tube 160 and contacts a terminal-probe spring 138. Given that the probe 108 slidably resides within the probe cavity 164 and about the tube 160, the probe 108 is thereby spring-loaded within the probe cavity 164. The rear 103 of the rapid-connect coupler 100 is defined by an end fitting 140, which houses the tube 160 and supports the terminal-probe spring 138. End fitting packing 122 also resides between the housing 124 and the end fitting 140. The end fitting 140 also includes a plunger 142, which comprises plunger packing 158 and a plunger-backup ring 156.

The end fitting 140 further comprises an end fitting cavity 168, which extends along the central axis X and through a terminal coupler 166. As depicted herein, the terminal coupler 166 comprises a threaded extension, which allows complementary threaded components (not shown) to couple with the terminal coupler 166. However, in various embodiments, the terminal coupler may be any suitable, shape, configuration or size, depending on the hardware that is desired to be coupled to the rapid-connect coupler 100 via the terminal coupler 166.

Furthermore, slidably surrounding portions of the housing 124, end fitting 140 and latch segment 110 is a sleeve 118. The sleeve 118 contacts a sleeve spring 120, and the sleeve spring 120 also contact a spring pad 154. Accordingly, the sleeve 118 is spring-loaded about the housing 124, end fitting 140 and latch segment 110.

Additionally, a ball 126 resides within a ball cavity 170 within the probe cavity 164, which is defined by the housing 124 and the sleeve 118. As shown and described herein, the ball 126 may contact a ball cam 114 in various configurations, which is positioned on the probe 108. Additionally, in various embodiments, the sleeve 118 may be held in the configuration depicted in FIG. 1 by the ball 126, and tension of the sleeve spring 120 pushes the sleeve 118 against the ball 126.

Referring now to FIG. 2, the rapid-connect coupler 100 is depicted in a second configuration wherein the probe 108 is pushed back into the probe cavity 164. For example, in an embodiment, the probe 108 may be inserted into a gas connector 400 (FIG. 4) and the force of insertion causes the probe 108 to compress the terminal probe spring 138, which allows the probe 108 to shift further into the probe cavity 164 as depicted in FIG. 2.

The movement of the probe 108 into the probe cavity 164 causes the ball cam 114 to move into position over the ball cavity 170 and the ball 126. Additionally, a latch lip notch 176 on the probe 138 shifts into position under the latch lip 174.

Referring now to FIG. 3, the rapid-connect coupler 100 is depicted in a third configuration wherein the probe 108 is pushed back into the probe cavity 164, the sleeve 118 shifts forward, and the latch segment 110 rotates into the latch-lip notch 176. In various embodiments, the third configuration occurs subsequent to the second configuration depicted in FIG. 2.

In the third configuration depicted in FIG. 3, the ball 126 shifts into the ball cavity 170, which allows the sleeve 118, which may be under tension of the sleeve spring 120, to shift forward. Such forward movement of the sleeve 118 forces the latch lip 174 of the latch segment 110 into the latch-lip notch 176, which causes the latch segment 110 to rotate about the pin 112. Accordingly, the latch nose 172 rotates away from the probe 108 and is held in position by the sleeve 118.

FIG. 4 depicts a rapid-connect coupler 100 and a gas connector 400 in accordance with an embodiment. The gas connector 400 depicted in FIG. 4 is a CGA 580 port; however, in various embodiments, a rapid-connect coupler 100 may be adapted or operable to couple with various CGA ports, or other ports having a cavity. Such ports may or may not include threads.

Referring to FIG. 4, the gas connector 400 defines a front, middle and rear cavity 410, 430, and 440 and includes threads 420 in the front cavity 410. In an embodiment, the rapid-connect coupler 100 is operable to couple with the gas connector 400 when the rapid-connect coupler 100 is inserted into the gas connector 400.

For example, the probe 108 is inserted into the gas connector 400, and a front portion of the probe 108 corresponds to the middle cavity 430, and the tip 102 corresponds to the rear cavity 440. The front portion of the probe 108 and the probe packing 106 may engage a portion of the middle cavity 430 and the tip 102 may enter the rear cavity 440. The engagement of the probe 108 with the middle cavity 430 allows the probe 108 to be pushed back into the probe cavity 164, which may cause the rapid-connect coupler 100 to assume the second configuration depicted in FIG. 2 and then the third configuration depicted in FIG. 3. When the rapid-connect coupler 100 assumes the third configuration as depicted in FIG. 3, the latch segment 110 (or the plurality of latch segments 110) rotate to engage the threaded portion 420. The rapid-connect coupler 100 is thereby held and coupled within the gas connector 400 and forms a seal therewith such that gas may be transferred through the gas connector 400 and the rapid-connect coupler 100.

In an embodiment, the ball cam 114 may be biased by the cam spring 116. A biased ball cam 114 may be desirable in some embodiments because it may provide for improved seating and coupling of the probe 180 within a gas connector 400. The biased ball cam 114 may prevent a gap from remaining between the probe front end 105 and the middle cavity 430 of the gas connector 400. Having a biased ball cam 114 may allow the probe 108 to move forward under pressure of gas within the fluid passageway 168 and thereby naturally find and maintain a tight fit within the gas connector 400. Additionally, the biased ball cam 114 may provide for positive radial placement of the latch segments 110, which may or may not comprise threads.

In some embodiments, the latch nose 172 may comprise threads, which correspond to the threaded portion 420 of the gas connector 400, or which may engage a portion of the gas connector 400 regardless of whether the gas connector 400 comprises threads or not.

Additionally, in various embodiments, the tip 102 may be configured to actuate a check-valve or residual pressure valve within the gas connector 400 (e.g., within the third cavity 440). Accordingly, in various embodiments, the tip 102 may be configured in various ways to correspond to a check-valve or other structure within the gas connector 400. However, in some embodiments, the tip 102 may be absent.

The components of the rapid-connect coupler 100 may be made of any suitable material. For example, suitable materials may include, but not be limited to corrosion resistant steel, brass, or the like. Other suitable materials for various components may include nitrile butadiene rubber, Polytetrafluoroethylene, or the like.

In various embodiments the rapid-connect coupler 100 may be part of a gas cylinder charging system. For example, a rapid-connect coupler 100 may be attached to a tube or hose, which is connected to a pressurized gas source. In some embodiments, a plurality of rapid-connect couplers 100 may be coupled to the pressurized gas source. In such embodiments, pressurized gas cylinders may be rapidly charged either alone or as a group by coupling the one or more rapid-connect couplers 100 to the fill-port of each cylinder and charging the tanks via the pressurized gas source.

Figure 6:
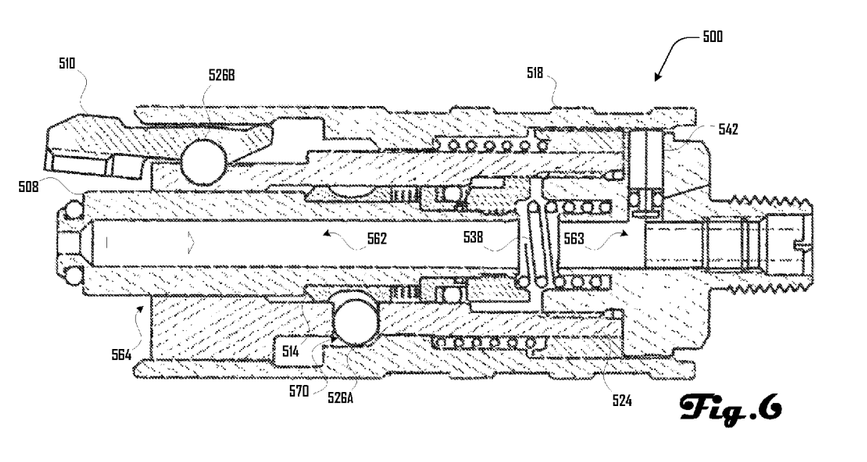
FIG. 6 is a cross section of the rapid-connect coupler in a second configuration in accordance with the embodiment of FIG. 5.
Figure 7:
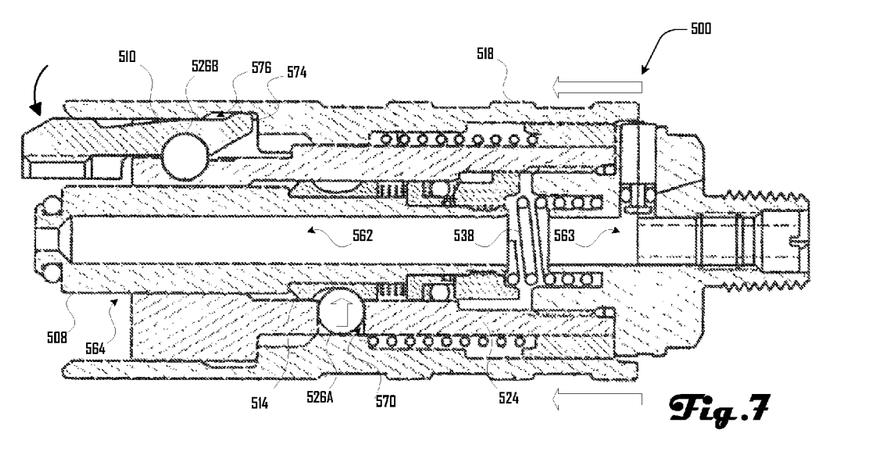
FIG. 7 is a cross section of the rapid-connect coupler in a third configuration in accordance with an embodiment of FIG. 5.
Figure 8:
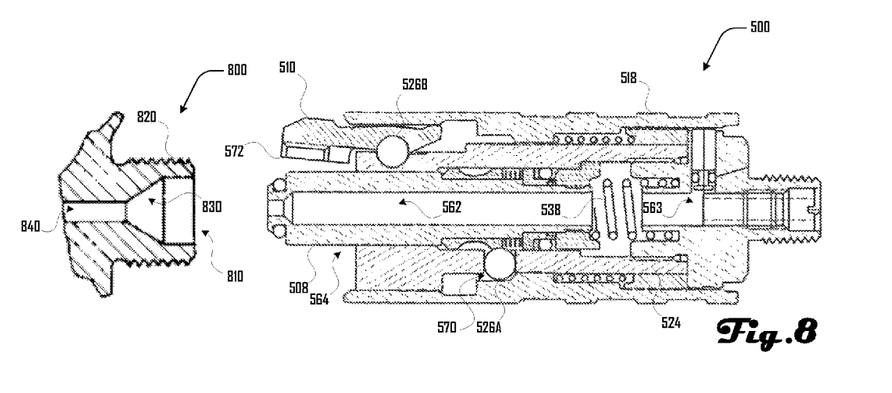
FIG. 8 is a cross section of a rapid-connect coupler and a cross section of a gas connector in accordance with an embodiment of FIG. 5.

FIGS. 5-8 depict a rapid-connect coupler 500 in accordance with another embodiment, which may be operable to couple with a gas connector 800 (FIG. 8). The rapid-connect coupler 100 depicted in FIGS. 1-4 may be considered a "male" coupler embodiment, as it couples within a gas connector 400, and the rapid-connect coupler 500 depicted in FIGS. 5-8 may be considered a "female" coupler embodiment, as it couples to the exterior of a gas connector 800.

FIG. 5 depicts the rapid-connect coupler 500 in a first configuration, which may be a resting configuration before the rapid-connect coupler 500 couples with a gas connector 800. FIGS. 6 and 7 depict the rapid-connect coupler 500 in second and third configurations, which may represent configurations that the rapid-connect coupler 500 assumes when coupling with or when coupled to a gas connector 800.

As shown in FIGS. 5-8, the rapid-connect coupler 500 comprises a probe 508, which is an elongated member that extends from the front end 501 of the rapid-connect coupler 500 and resides within a probe cavity 564. The probe cavity 564 is defined by a housing 524, and a latch segment 510.

The latch segment 510 resides between the housing 524 and a sleeve 518, and is configured to rotate about a latch bearing 526B as shown and described herein. In various embodiments, there may be a plurality of latch segments 510. For example, there may be a first, second, and third latch segment 510 positioned within the housing 524. In some embodiments, there may be any suitable number of latch segments 510. Latch segments 510 may be positioned around the circumference of the probe 508 and may facilitate coupling of the rapid-connect coupler 500 with a gas connector 800 (FIG. 8).

Referring now to FIG. 6, the rapid-connect coupler 500 is depicted in a second configuration wherein the probe 508 is pushed back into the probe cavity 564. For example, in an embodiment, the probe 508 may be inserted into a gas connector 800 (FIG. 8) and the force of insertion causes the probe 508 to compress a terminal probe spring 538, which allows the probe 508 to shift further into the probe cavity 564 as depicted in FIG. 6.

The movement of the probe 508 into the probe cavity 564 causes the ball cam 514 to move into position over the ball cavity 570 and the ball 526A.

Referring now to FIG. 7, the rapid-connect coupler 500 is depicted in a third configuration wherein the probe 508 is pushed back into the probe cavity 564, the sleeve 518 shifts forward, and the latch segment 510 rotates toward the probe 508. In various embodiments, the third configuration occurs subsequent to the second configuration depicted in FIG. 6.

In the third configuration depicted in FIG. 7, the ball 526A shifts into the ball cavity 570, which allows the sleeve 518, which may be under tension, to shift forward. Such forward movement of the sleeve 518 forces a latch lip 574 of the latch segment 510 into a latch-lip notch 576 defined by the sleeve 518, which causes the latch segment 510 to rotate about the latch bearing 526B. Accordingly, latch segment 510 rotates toward the probe 508 and is held in position by the sleeve 518.

FIG. 8 depicts a rapid-connect coupler 500 and a gas connector 800 in accordance with an embodiment. The gas connector 800 depicted in FIG. 8 is a CGA 540 port; however, in various embodiments, a rapid-connect coupler 500 may be adapted or be operable to couple with various CGA ports, or other ports having a cavity. Such ports may or may not include threads externally or internally.

Referring to FIG. 8, the gas connector 800 defines a front, middle and rear cavity 810, 830, and 840 and includes threads 820 externally. In an embodiment, the rapid-connect coupler 500 is operable to couple with the gas connector 800 when the rapid-connect coupler 500 is inserted into the gas connector 800.

For example, the probe 508 is inserted into the gas connector 800, and the probe 508 corresponds to one or more cavity 810, 830, and 840. The engagement of the probe 508 with the gas connector 800 allows the probe 508 to be pushed back into the probe cavity 564, which may cause the rapid-connect coupler 500 to assume the second configuration depicted in FIG. 6 and then the third configuration depicted in FIG. 7. When the rapid-connect coupler 500 assumes the third configuration as depicted in FIG. 7, the latch segment 510 (or the plurality of latch segments 510) rotate to engage the threaded portion 820. The rapid-connect coupler 500 is thereby held and coupled within the gas connector 800 and forms a seal therewith such that gas may be transferred through the gas connector 800 and the rapid-connect coupler 500.

In some embodiments, the latch segment 510 may comprise threads, which correspond to the threaded portion 820 of the gas connector 800, or which may engage a portion of the gas connector 800 regardless of whether the gas connector 800 comprises threads or not.

Additionally, in various embodiments, the probe 508 may be configured to actuate a check-valve or residual pressure valve within the gas connector 800 (e.g., within the probe 108 as depicted in FIGS. 1-4). Accordingly, in various embodiments, the probe 508 may be configured in various ways to correspond to a check-valve or other structure within the gas connector 800.

Figure 9A:
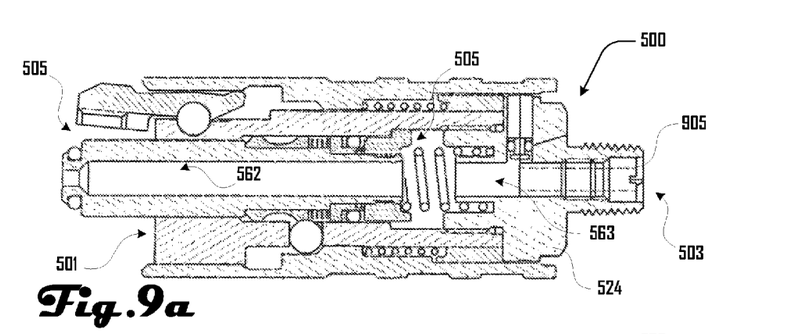
FIGS. 9*a* and 9*b* depict a cross section of the rapid-connect coupler of FIGS. 5-8 with a removable plug in accordance with an embodiment.
Figure 9B:
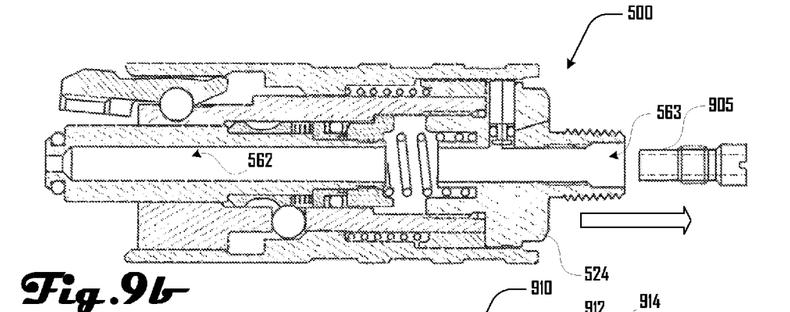

FIGS. 9a and 9b depict the rapid-connect coupler 500 of FIGS. 5-8 with a removable plug 905 in accordance with an embodiment. The plug 905 may be removably disposed within the fluid passageway 562 at the second housing end 503. For example, FIG. 9a depicts a plug 905 disposed within the second housing end 503 within a plug orifice 563 and FIG. 9b depicts the plug 905 removed from the plug orifice 563.

Figure 9C:
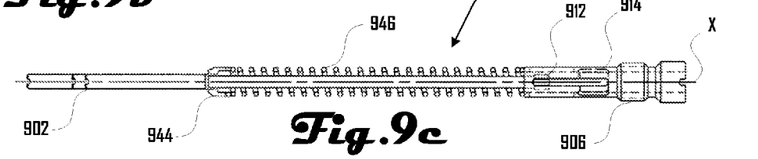
FIG. 9*c* depicts a cross section of a replaceable actuator assembly, in accordance with an embodiment.

FIG. 9c depicts a replaceable actuator assembly 910, in accordance with an embodiment. The actuator assembly 910 comprises a tip 902, a spring pad 944, and a spring 946. The tip 902 slidably resides within an actuator-plug 906 and is biased by the spring 946. The tip 902 may also comprise a bayonet guide 912, which moves within a guide-slot 914 defined by the actuator-plug 906. In some embodiments an actuator assembly 910 may comprise a separate actuator-plug 906 or the actuator-plug 906 may be in integral part of the actuator assembly 910.

Figure 9D:
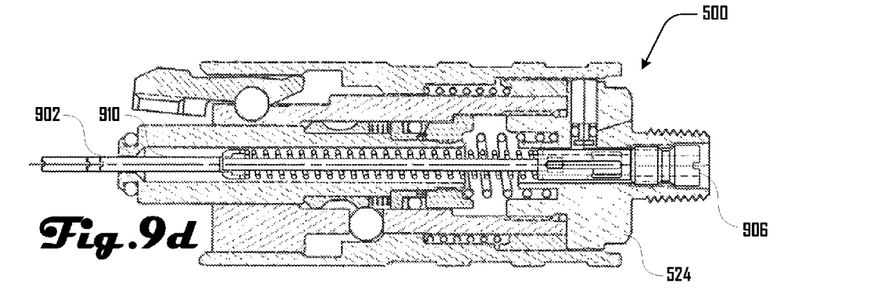
FIG. 9*d* depicts a cross section of the replaceable actuator assembly of FIG. 9*c* residing within the rapid-connect coupler of FIGS. 5-8 in accordance with an embodiment.

In an embodiment, the actuator assembly 910 may be removably disposed within the plug orifice 563 and/or the fluid passageway 562 as depicted in FIG. 9d. For example, the plug 905 may be removed from the second housing end 503 and the actuator assembly 910 may be inserted into the second housing end 503. The actuator-plug 906 may correspond to the plug 905 and may couple the actuator assembly 910 within a portion of the fluid passageway 562. The tip 902 may extend from the first-probe end 505 and be operable to actuate a check valve in a gas connector 800, 400 (FIGS. 4 and 8) as described herein. The tip 902 may be biased and operable to retract within the probe first end 905.

The tip 902 may be operable to be locked in a retracted position within the probe first end 905. For example, this may be desirable in an embodiment because the rapid-connect coupler 500 may be easily and quickly adapted for use with a gas connector 800, 400 with or without a check valve. Such a gas connector 800, 400 and check valve may be part of a CGA gas coupler.

When the rapid-connect coupler 500 is used with gas connector 800, 400 having a check valve, the tip 902 may be configured in an extended position (e.g., FIG. 9d). However, when the rapid-connect coupler 500 is used with a gas connector 800, 400 that does not have a check valve, the tip 902 may be configured in a locked retracted position wherein a portion of the tip 902 is within the first probe end 905 compared to the extended position. The tip 902 may be locked in the retracted position by pushing the tip 902 within the first probe end 905, and may be unlocked by again pushing the tip 902.

Figure 10A:
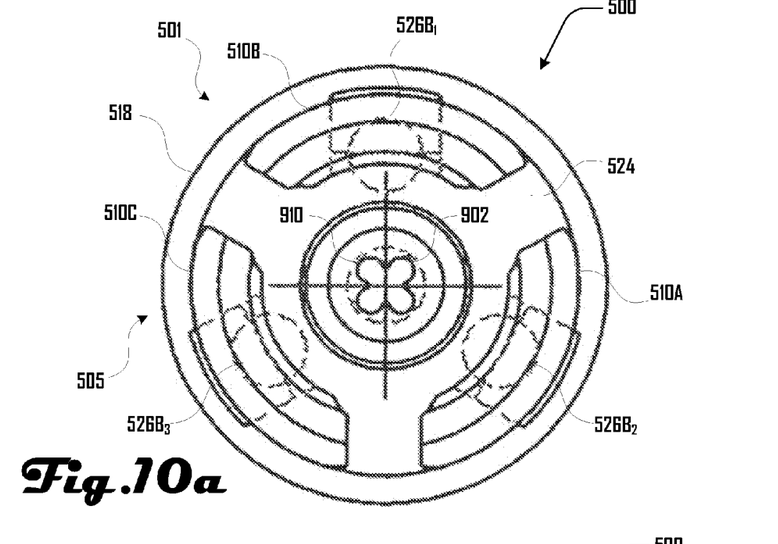
FIG. 10*a* depicts a front end of the rapid-connect coupler of FIGS. 5-8 in accordance with an embodiment.

FIG. 10a depicts a rapid-connect coupler 500 of FIGS. 5-8 in accordance with an embodiment. The housing 524 may have a substantially cylindrical first-housing end 501 and substantially cylindrical probe 508 having a first-probe end 505 slidably residing within the probe cavity 564 at the first-housing end 501 with the first-probe end 505 extending from the probe cavity 564. The rapid-connect coupler 500 may include three latch segments 510A, 510B, 510C that define a substantially contiguous circumference about the first probe end 505. The latch segments 510A, 510B, 510C may be pivotally coupled about the first housing end 505 circumference via a latch bearing $526B_1$, $526B_2$, $526B_3$ respectively, and may be fixed in position and inoperable to translate about the first-housing end 505 circumference.

For example, having three latch segments 510A, 510B, 510C that are fixed in position and inoperable to translate about the first-housing end 505 circumference may be desirable because it provides three points of solid contact with a gas connector 800, 400 that the rapid-connect coupler 500 may couple with. Lack of mobility of the three latch segments 510A, 510B, 510C may allow the improved alignment with respective threads on the latch segments 510A, 510B, 510C and gas connector 800, 400, which may result in an improved connecting between the rapid-connect coupler 500 and gas connector 800, 400.

Figure 10B:
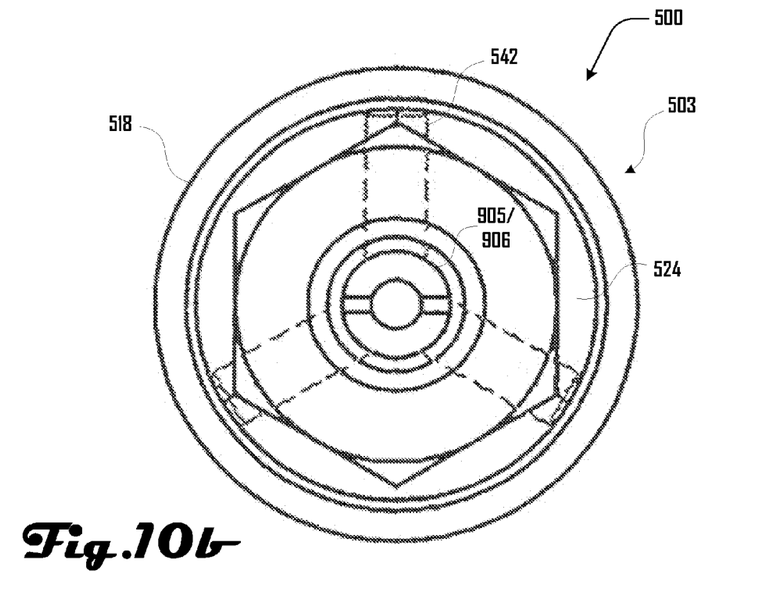
FIG. 10*b* depicts a rear end of the rapid-connect coupler of FIGS. 5-8 in accordance with an embodiment.

FIG. 10b depicts a rear end 503 of the rapid-connect coupler 500 of FIGS. 5-8 in accordance with an embodiment, which may include a plug 905 or an actuator plug 906 of an actuator apparatus 910.

Additionally, although specific embodiments have been illustrated and described herein, it will be appreciated by those of ordinary skill in the art and others, that a wide variety of alternate and/or equivalent implementations may be substituted for the specific embodiment shown and described without departing from the scope of the embodiments described herein. This application is intended to cover any adaptations or variations of the embodiment discussed herein. While various embodiments have been illustrated and described, as noted above, many changes can be made without departing from the spirit and scope of the embodiments described herein.

The invention claimed is:

1. A rapid-connect coupling apparatus for coupling with a connector, comprising:

a housing defining a probe cavity, the housing having a first housing end and a second housing end;

a probe having a first probe end and a second probe end, the probe configured to slidably reside within the probe cavity, wherein the first probe end extends out from the first housing end;

a fluid passageway defined by the probe and the housing, the fluid passageway configured to communicate fluid between the first probe end and the second housing end;

at least one latch segment pivotally coupled to the first housing end and having a first latch end disposed in contact with the first probe end when the rapid-connect coupling apparatus and the connector are in a non-coupled state;

a sleeve configured to slidably reside about the housing, wherein the sleeve is further configured to cause the first latch end of the at least one latch segment to lift up off and away from the probe when the sleeve is slid about the housing; and wherein the at least one latch segment is configured to grip an outer portion of the connector when the first latch end is lifted off the probe while the rapid-connect coupling apparatus and the connector are in a coupled state.

2. The rapid-connect coupling apparatus of claim 1, further comprising a check valve actuating apparatus disposed within a portion of the fluid passageway and extending from the first probe end.

3. The rapid-connect coupling apparatus of claim 2, wherein the check valve actuating apparatus is removable via the second housing end.

4. The rapid-connect coupling apparatus of claim 3, further comprising a fluid passageway plug removably disposed within the fluid passageway at the second housing end configured to secure the check valve actuating apparatus within the portion of the fluid passageway.

5. The rapid-connect coupling apparatus of claim 2, wherein the check valve actuating apparatus is biased by a spring and a portion of the check valve actuating apparatus is operable to retract within the first probe end.

6. The rapid-connect coupling apparatus of claim 5, wherein the check valve actuating apparatus is configured to be locked in a retracted position.

7. The rapid-connect coupling apparatus of claim 1,
wherein the first housing end and the first probe end are substantially cylindrical; and
wherein the at least one latch segment is pivotally coupled about a circumference of the first housing end and fixed in position such that the at least one latch segment is inoperable to translate about the circumference of the first housing end.

8. The rapid-connect coupling apparatus of claim 7, wherein the at least one latch segment is positioned around a circumference of the first probe end.

9. The rapid-connect coupling apparatus of claim 7, wherein the at least one latch segment comprises three latch segments that are positioned around a circumference of the first probe end.

10. The rapid-connect coupling apparatus of claim 1, further comprising a ball cam surrounding a portion of the probe within the probe cavity.

11. The rapid-connect coupling apparatus of claim 10, wherein the ball cam is slidably biased along a length of the probe.

12. The rapid-connect coupling apparatus of claim 1, further comprising:
a ball cavity defined by a portion of the sleeve and a portion of the housing; and
at least one ball disposed in the ball cavity.

13. The rapid-connect coupling apparatus of claim 1, further comprising:
a ball cam surrounding a portion of the probe within the probe cavity, the ball cam slidably biased along a length of the probe;
a ball cavity defined by a portion of the sleeve and a portion of the housing;
at least one ball disposed in the ball cavity;
wherein the probe is configured to slide longitudinally within the probe cavity from a resting position to a coupling position;
wherein the ball cam is misaligned with the ball cavity and ball in the resting position; and
wherein the ball cam is aligned with the ball cavity and ball in the coupling position.

14. The rapid-connect coupling apparatus of claim 13,
wherein the sleeve is biased longitudinally along a length of the housing toward the first housing end; and
wherein the ball is biased by the sleeve toward the probe and operable to shift into the ball cam when the ball cam is aligned with the ball.

15. The rapid-connect coupling apparatus of claim 13,
wherein the sleeve is biased longitudinally along a length of the housing toward the first housing end;
wherein the ball is configured to hold the sleeve in a retracted position when the probe is in the resting position; and
wherein the ball is configured to release the sleeve into an extended position when the probe assumes the coupling position.

16. A rapid-connect coupling apparatus for coupling with a connector, comprising:
a housing defining a probe cavity, the housing having a first housing end and a second housing end;
a probe having a first probe end and a second probe end, the probe configured to slidably reside within the probe cavity, wherein the first probe end extends out from the first housing end;
a fluid passageway defined by the probe and the housing, the fluid passageway configured to communicate fluid between the first probe end and the second housing end;
a check valve actuating apparatus disposed within a portion of the fluid passageway and extending beyond the probe at the first probe end, wherein engagement of the check valve actuating apparatus with a rear cavity portion of the connector causes the probe to be pushed further into the probe cavity;
a ball cam surrounding a portion of the probe within the probe cavity; and
a sleeve configured to reside about the housing, and configured to actuate the ball cam toward the probe when moved about the housing in order to seal, at least in part, a gap between the probe and the connector when the rapid-connect coupling apparatus and the connector are in a coupled state.

17. The rapid-connect coupling apparatus of claim 16, wherein the check valve actuating apparatus is removable via the second housing end.

18. The rapid-connect coupling apparatus of claim 17, further comprising a fluid passageway plug removably disposed within the fluid passageway at the second housing end and configured to secure the check valve actuating apparatus within a portion of the fluid passageway.

19. The rapid-connect coupling apparatus of claim 16, wherein the check valve actuating apparatus is biased toward the first probe end and a portion of the check valve actuating apparatus is operable to retract within the first probe end.

20. The rapid-connect coupling apparatus of claim 16, wherein the check valve actuating apparatus is configured to be locked in a retracted position.

21. A rapid-connect coupling apparatus comprising:
- a housing defining a probe cavity having a substantially cylindrical first housing end and a substantially cylindrical second housing end;
- a probe having a first probe end and a second probe end, the probe configured to slidably reside within the probe cavity, wherein the first probe end extends out from the first housing end; and
- at least one latch segment pivotally coupled about a circumference of the first housing end, and fixed in position such that the at least one latch segment is inoperable to translate about the circumference of the first housing end, the at least one latch segment having a first latch end disposed in contact with the first probe end when the rapid-connect coupling apparatus is in a non-engagement state;
- a sleeve configured to slidably reside about the housing, wherein the sleeve is further configured to cause the first latch end to lift up off and away from the probe when the sleeve is slid about the housing; and
- wherein the at least one latch segment is configured to grip an outer portion of a connector when the first latch end is lifted off the probe when the rapid-connect coupling apparatus is in an engagement state.

22. The rapid-connect coupling apparatus of claim 21, wherein the at least one latch segment is positioned around a circumference of the first probe end.

23. The rapid-connect coupling apparatus of claim 21, wherein the at least one latch segment comprises three latch segments.

24. The rapid-connect coupling apparatus of claim 21, wherein the at least one latch segment is pivotally coupled about the circumference of the first housing end and fixed in position via at least one latch ball.

25. A rapid-connect coupling apparatus for coupling with a connector, comprising:
- a housing defining a probe cavity, the housing having a first housing end and a second housing end;
- a probe having a first probe end and a second probe end, the probe configured to slidably reside within the probe cavity, wherein the first probe end extends out from the first housing end;
- a ball cam surrounding a portion of the probe within the probe cavity; and
- a sleeve configured to reside about the housing and configured to actuate the ball cam toward the probe when moved about the housing in order to seal, at least in part, a gap between the probe and the connector when the rapid-connect coupling apparatus and the connector are in a coupled state.

26. The rapid-connect coupling apparatus of claim 25, wherein the ball cam is slidably biased along a length of the probe.

27. The rapid-connect coupling apparatus of claim 25, wherein the ball cam is biased toward the first probe end.

28. The rapid-connect coupling apparatus of claim 25, further comprising:
- a ball cavity defined by a portion of the sleeve and a portion of the housing; and
- at least one ball disposed in the ball cavity.

29. The rapid-connect coupling apparatus of claim 28, wherein the sleeve is biased longitudinally along a length of the housing toward the first housing end; and
wherein the ball is biased by the sleeve toward the probe and operable to shift into the ball cam when the ball cam is aligned with the at least one ball.

30. The rapid-connect coupling apparatus of claim 28, wherein the sleeve is biased longitudinally along a length of the housing toward the first housing end;
wherein the ball is configured to hold the sleeve in a retracted position when the probe is in a resting position; and
wherein the ball is configured to release the sleeve into an extended position when the probe assumes a coupling position.

31. The rapid-connect coupling apparatus of claim 25, further comprising:
- a ball cavity defined by a portion of the sleeve and a portion of the housing;
- at least one ball disposed in the ball cavity;
- wherein the probe is configured to slide longitudinally within the probe cavity from a resting position to a coupling position;
- wherein the ball cam is misaligned with the ball cavity and the at least one ball in the resting position; and
- wherein the ball cam is aligned with the ball cavity and the at least one ball in the coupling position.

* * * * *